United States Patent [19]

Prochazka et al.

[11] Patent Number: 4,671,914
[45] Date of Patent: Jun. 9, 1987

[54] PRODUCTION OF GRANULATES BY USING A TABLETTING MACHINE

[75] Inventors: Josef Prochazka, Kleinschwarzenlohe; Jochen G. von Grätz, Feucht, both of Fed. Rep. of Germany

[73] Assignee: Ludwig Heumann & Co. GmbH, Nuremberg, Fed. Rep. of Germany

[21] Appl. No.: 858,096

[22] Filed: Apr. 30, 1986

Related U.S. Application Data

[62] Division of Ser. No. 635,455, Jul. 30, 1984, abandoned.

[30] Foreign Application Priority Data

Sep. 1, 1983 [DE] Fed. Rep. of Germany ....... 3331589

[51] Int. Cl.$^4$ .............................................. B29C 67/24
[52] U.S. Cl. .................................... 264/118; 264/123; 264/142; 425/181; 425/258; 425/310; 425/354; 425/464
[58] Field of Search ............... 425/6, 78, 128, 308, 425/310, 311, 352, 354, 355, 376 R, 461, 464, 181, 258; 264/117, 118, 109, 141, 142, 143, 123, 126, 40.1, 40.5, 40.6, 40.7, 123

[56] References Cited

U.S. PATENT DOCUMENTS

| | | | |
|---|---|---|---|
| 1,603,694 | 10/1926 | Hill | 425/181 |
| 2,634,692 | 4/1953 | Sherbondy | 425/181 |
| 3,708,256 | 1/1973 | Kopp | 425/376 |
| 3,726,622 | 4/1973 | DeTroyer et al. | 425/78 |
| 4,080,128 | 3/1978 | Schreiner et al. | 425/78 |
| 4,166,716 | 9/1979 | De Santis | 425/78 |

FOREIGN PATENT DOCUMENTS

| | | |
|---|---|---|
| 233040 | 9/1959 | Australia . |
| 1085139 | 7/1960 | Fed. Rep. of Germany . |
| 1291629 | 6/1961 | Fed. Rep. of Germany . |
| 2439538 | 3/1976 | Fed. Rep. of Germany . |
| 2652090 | 5/1978 | Fed. Rep. of Germany . |
| 3049597 | 10/1982 | Fed. Rep. of Germany . |
| 597638 | 1/1948 | United Kingdom . |
| 848680 | 9/1960 | United Kingdom . |
| 1136694 | 12/1968 | United Kingdom . |
| 1136889 | 12/1968 | United Kingdom . |
| 1363643 | 8/1974 | United Kingdom . |
| 1375883 | 11/1974 | United Kingdom . |
| 1553502 | 9/1979 | United Kingdom . |
| 1560607 | 2/1980 | United Kingdom . |
| 1581318 | 12/1980 | United Kingdom . |

Primary Examiner—Jan H. Silbaugh
Assistant Examiner—Mary Lynn Fertig
Attorney, Agent, or Firm—Weingarten, Schurgin, Gagnebin & Hayes

[57] ABSTRACT

The invention relates to the production of granulates by using a tabletting machine comprising at least one top punch and one bottom punch which co-operate with a die formed with a bore, the top punch being displaceable into the bore from outside to compress powder accommodated in the bore and the bottom punch displaceable in the bore being displaced within the bore for ejecting the powder compressed into a tablet, the tabletting machine additionally comprising a powder feed unit which introduces the powder into the bore when the top punch is in its raised position. According to the invention, a perforated plug in the bore of the die in conjunction with a granulate stripping, transporting and collecting system arranged beneath the lower end face of the perforated plug is used instead of the displaceable bottom punch for producing granulates.

5 Claims, 11 Drawing Figures

FIG. 1a
PRIOR ART
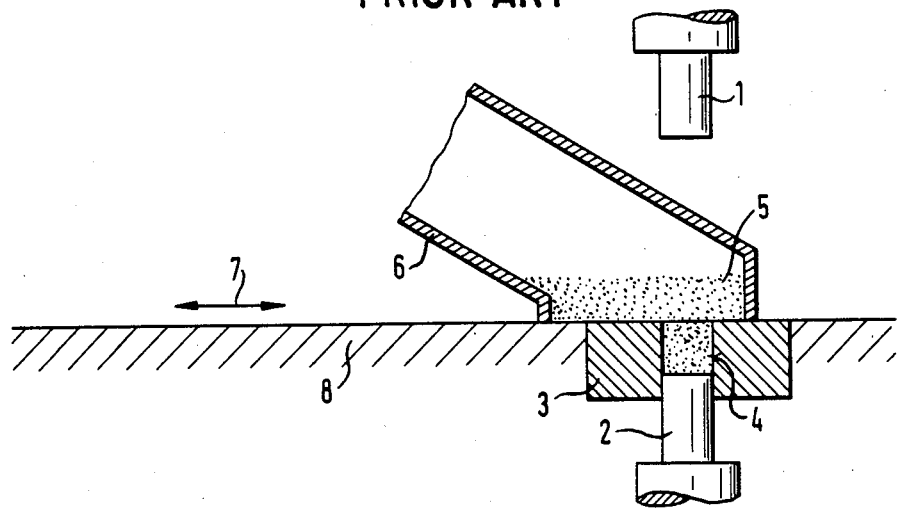
FIG. 1b
PRIOR ART
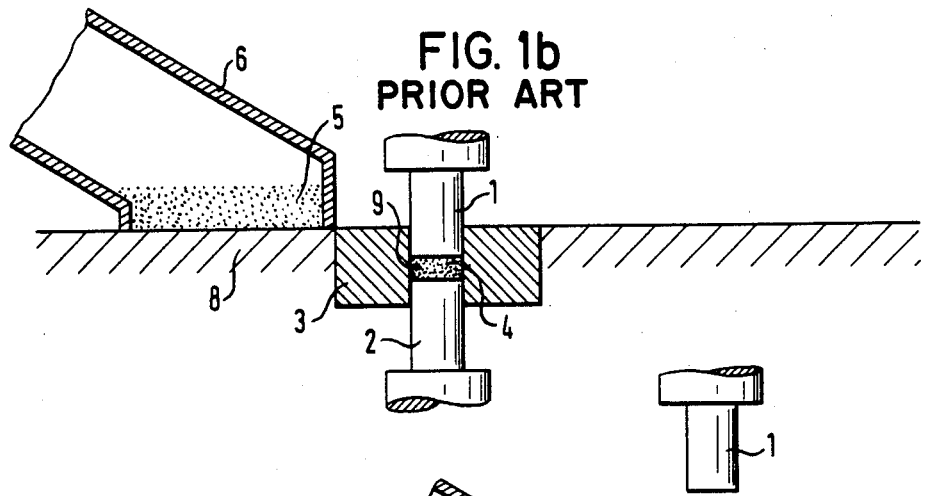
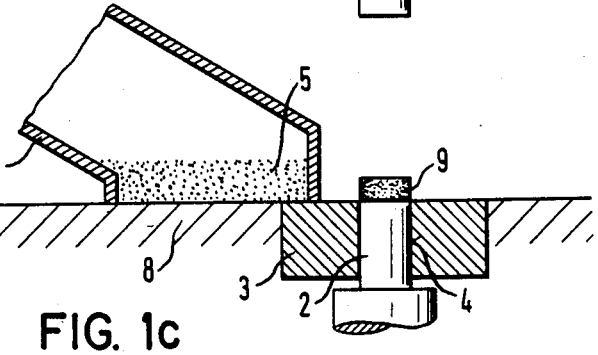
FIG. 1c
PRIOR ART

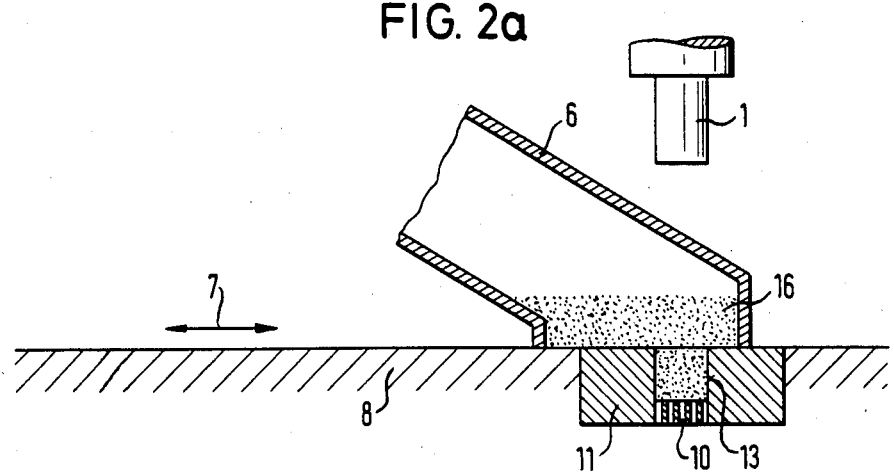
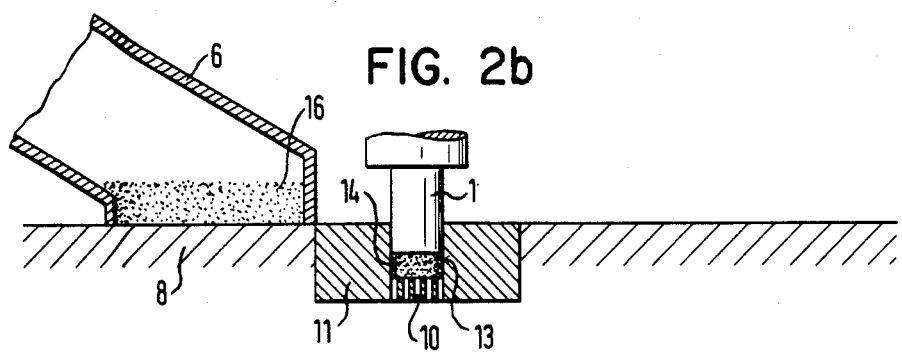
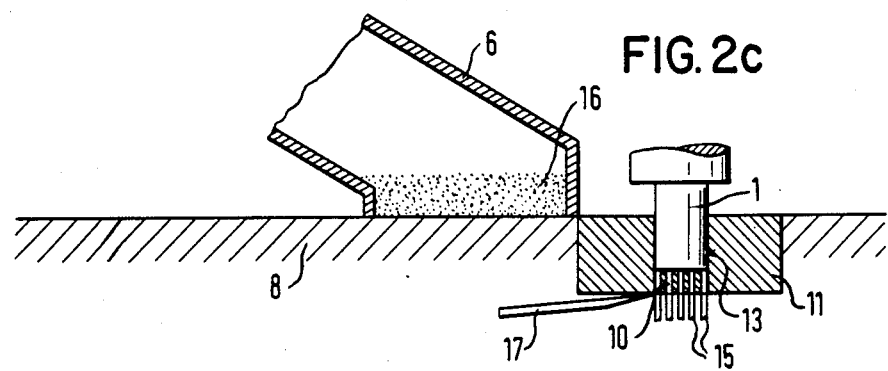

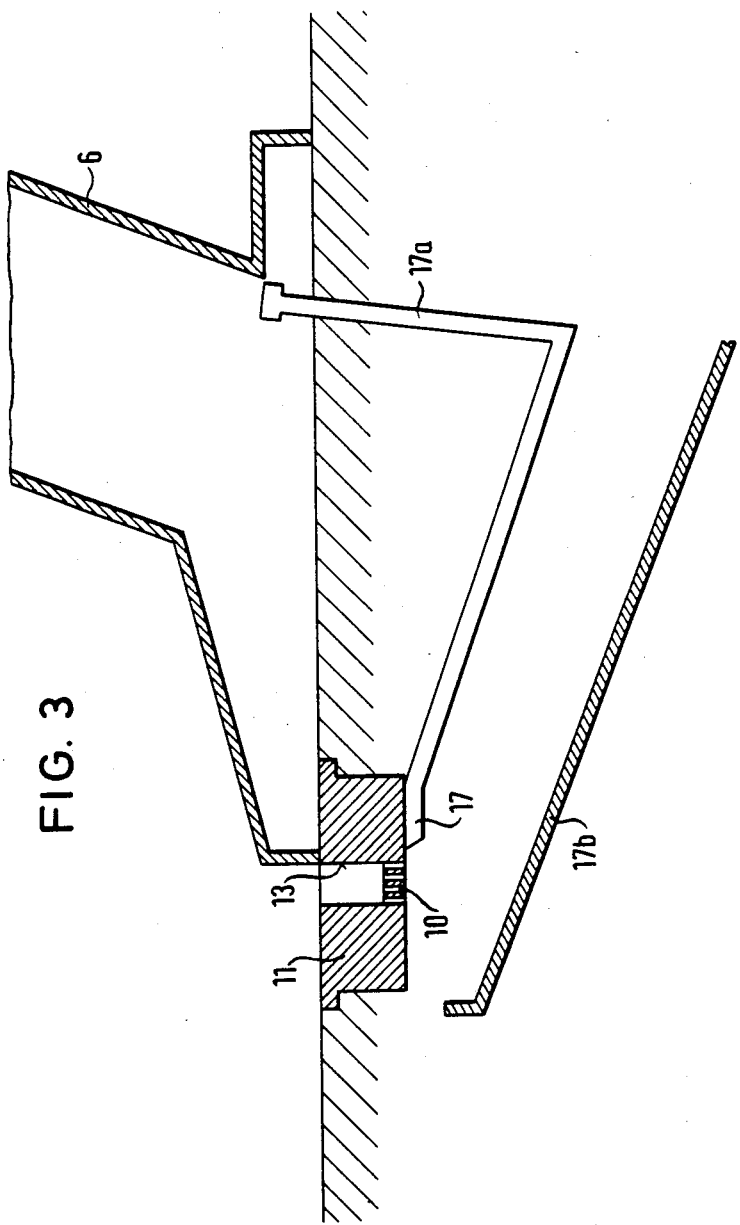

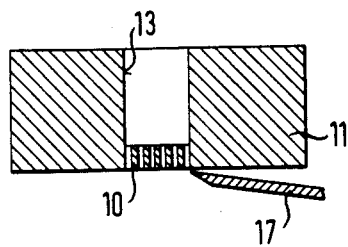
FIG. 6a
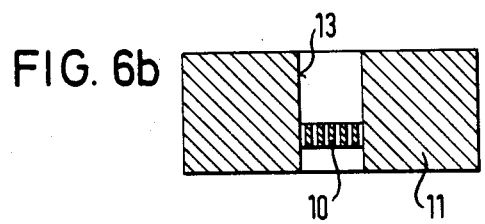
FIG. 6b
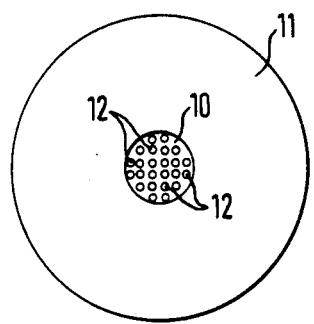
FIG. 6c
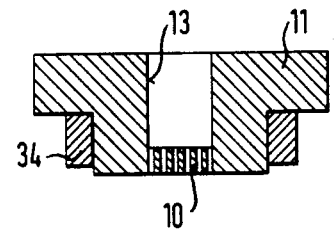
FIG. 6d
FIG. 6e
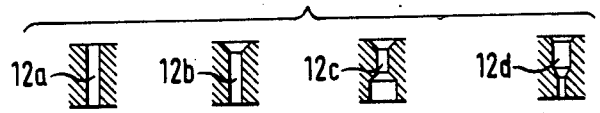

PRODUCTION OF GRANULATES BY USING A TABLETTING MACHINE

This application is a division of application Ser. No. 635,455 filed July 30, 1984, now abandoned.

FIELD OF THE INVENTION

This invention relates to the production of granulates by using a tabletting machine comprising at least one top punch and one bottom punch which co-operate with a die formed with a bore, the top punch being displaceable into the bore from outside to compress powder accommodated in the bore and the bottom punch displaceable in the bore being displaceable within the bore for ejecting the powder compressed into a tablet, the tabletting machine additionally comprising a powder feed unit which introduces the powder into the bore when the top punch is in its raised position.

BACKGROUND OF THE INVENTION

There are already several known processes and machines for producing granulates, particularly cylindrical granulates. The granulates produced in this way may be used for a variety of different purposes, for example as medicaments with sustained release of the active principle(s), in which case the active principles are embedded by granulation in auxiliaries which in turn contain meltable fats or waxes as binder. In addition, the granulates produced are very often used as intermediate products for the production of plastic articles, for example from thermoplastic plastics.

Thus, Applicants' own DE-AS No. 24 39 538 describes a process for the production of orally administered sustained-release medicaments in which a mixture of powdered active principles, binder and filler is compressed to form cylindrical granulates. This is done by granulating the powder-form mixture of the above-mentioned ingredients, which is plasticizable under heat or pressure, in a gearwheel granulating machine. This gearwheel granulating machine comprises two interengaging holed or perforated plate rollers, i.e. hollow rollers with cylindrical bores or rollers with drilled plates inserted therein. Gearwheel granulating machines such as these compress the powder-form mixture into strands which are then size-reduced to granulates either by means of suitably arranged blades or by grinding. One disadvantage of this process, of which a specific application is described, for example, in the above-mentioned DE-AS No. 24 39 538, lies in particular in the fact that the yield of granulate, based on the quantity of powder-form mixture initially used, is relatively low. This poor granulate yield is attributable above all to the fact that, due to the construction of this gearwheel granulating machine, the sealing of the hollow rollers with the cylindrical bores or of the rollers with the drilled plates inserted therein is very unsatisfactory so that, as a result, up to 50% of the powder-form mixture introduced ends up unchanged as powder or is crushed in the form of so-called blind scabs.

In addition, gearwheel granulating machines of the type in question are attended by design-related disadvantages, including for example an inclination towards increased friction in the vicinity of the granulating rollers which not only involves the danger of local overheating of the powder-form mixture to be granulated, but also results in a relatively high energy demand for operating the gearwheel granulating machine. In addition, it is necessary for design reasons additionally to support the hollow rollers with the cylindrical bores, or the rollers with drilled plates inserted therein in the vicinity of the product.

In addition to the production of granulates by means of gearwheel granulating machines comprising, for example, perforated rollers, there are several other processes and machines by means of which binder-containing, dry or moist powder-form mixtures are forced through sieve openings, perforated plates or nozzles.

Thus, DE-AS No. 10 85 139 for example describes a process for the production of granulate from powder-form material formable under pressure by forcing the powder-form material through a perforated plate by means of a ram or a screw, in which the pressure-forming operation takes place between room temperature and temperatures below the melting point or softening point of the material to be granulated. The press used for carrying out this process comprises a cylinder which is provided at one end with a perforated plate and in which a ram is mounted for displacement, feed lines for the free-flowing powder-form material to be granulated opening into the cylinder in the region of the displacement path of the ram. The openings of the perforations in the perforated plate are preferably wedge-shaped.

In this known process for the production of granulate and the machine used for carrying it out, as in other processes and machines in which binder-containing, dry or moist powder-form materials are forced through sieve openings, perforated plates or nozzles, preliminary compaction of the powder-form material and a length of at least several millimeters for the sieve openings, perforated plates or nozzles are necessary for obtaining the desired, regular and compact granulate particles after the subsequent size-reduction of the pressed material. Hitherto, it has only been special machines of the type used as screw or piston extruders, particularly in the processing of plastics, which have proved suitable for applying the forces required for compaction of the type in question.

In the processing of highly complex mixtures of active principles and auxiliaries of the type described, for example, in the above-mentioned DE-AS No. 24 39 538, the use of machines of the kind in question, which apply the strong forces required, involves numerous development and production problems. One of these problems is that the screw or the piston can easily seize in the screw or piston extruder. In addition, uncontrolled compaction and melting processes can take place ahead of the extrusion nozzle or die. In conjunction therewith and in view of the overall structure of machines of the type in question, the binder-containing, dry or moist powder-form materials can only be processed under intense heat with a loss of active principle(s), mixtures as complex as these of active principle(s) and auxiliaries being in danger of separating in the vicinity of the screw of a screw extruder so that the end product may contain inhomogeneities.

In addition, attempts to overcome the above-mentioned problems by processes and machines in which isostatic compression is applied have only been partly successful.

In processes and machines where isostatic compression is applied, the powder-form material to be compacted is introduced into the depressions of an elastic rubber mould and subjected together with that mould to an isostatic pressure so that the powder-form material is thus compressed. In an isostatic compression process such as this, the mould returns to its original dimensions after removal of the isostatic pressure and the compressed granulate particles lie loosely in the mould depressions and may be removed by upturning the mould. Isostatic compression is used, for example, for the granulation of nuclear fuels.

Compaction into powder-form materials by isostatic compression presupposes that the narrow bores in the die are adequately and uniformly filled before the isostatic compression step. However, only very few powder-form materials have such good flow properties. Above all, such flow properties are non-existent in binder-containing, moist powder-form materials, such as for example mixtures of active principles and auxiliaries of the type described in the above-mentioned DE-AS No. 24 39 538, in which meltable fats or waxes are used as binder. Accordingly, isostatic compression can only be successfully applied in a few special cases.

SUMMARY OF THE INVENTION

Now, the object of the present invention is to provide a possibility which enables granulates of, in particular, powder-form materials having only limited flow properties to be produced relatively simply, reliably and inexpensively.

It has now surprisingly been found that it is possible to produce granulates by using a tabletting machine comprising at least one top punch and one bottom punch which co-operate with a die formed with a bore, the top punch being displaceable into the bore from outside to compress powder accommodated in the bore and the bottom punch displaceable in the bore being displaced within the bore for ejecting the powder compressed into a tablet, the tabletting machine additionally comprising a powder feed unit which introduces the powder into the bore when the top punch is in its raised position, provided that, for producing granulates, a perforated plug in the bore of the die, in conjunction with a granulate stripping, transporting and collecting system arranged beneath the lower end face of the perforated plug is used in accordance with the invention in place of the displaceable bottom punch.

It is surprising that a tabletting machine, i.e. a tablet press which, hitherto, has been used solely for the production of standard tablets 3 millimeters or more in diameter, may be used after only slight modification for the production of cylindrical granulates, for example 1 Millimeter in diameter, in the manner described above.

In one embodiment of the invention, a perforated plug of which the lower end face is flush with the lower end of the bore is used, providing for problem-free stripping of the strands compressed from the powder-form material.

An embodiment of the invention in which a perforated plug of which the lower end face is countersunk in the bore in the die is used may be used in the case of non-tacky powder-form materials.

In a further development of the invention, a device for controlling or regulating the temperature of the powder delivered to and/or accommodated in the bore may be used. In this way it is possible to control or regulate the degree of melting of a binder, for example a meltable fat or wax, present in the powder. To this end, the device for controlling or regulating the temperature of the powder may be used in conjunction with a heating system provided on or in the die.

In the above-described embodiment of the invention in which a perforated plug of which the lower end face is flush with the lower end of the bore is used, a stripper co-operating with the lower end face of the perforated plug is preferably used for stripping off the granulate issuing from the perforations in the plug.

In a structurally particularly advantageous embodiment, the mechanism for moving the loading shoe, which has been removed, may be used for reciprocating the stripper in the case of an eccentric tabletting machine.

The use in accordance with the invention of a tabletting machine available in any case, particularly in pharmaceutical factories, for the production of granulates by relatively very simple and readily reversible modification of the tabletting machine provides for relatively simple, operationally reliable and inexpensive production of the granulates, particularly when the powder-form material which is to be converted into the particular granulate has relatively poor flow properties because the fluidity of the dry powder-form constituents is reduced by binders.

BRIEF DESCRIPTION OF THE DRAWING

Embodiments of the invention are described in detail in the following, with a brief explanation of two tabletting machines suitable for use in accordance with the invention, with reference to the accompanying drawings, wherein:

FIG. 1 shows a state-of-the-art tabletting machine in the form of an eccentric press at three different stages of tablet production.

FIG. 2 shows the tabletting machine according to FIG. 1 in its use in accordance with the invention for the production of granulates, again at three different stages of production.

FIG. 3 shows the granulate stripping and collecting system on an eccentric press in one embodiment of the invention.

FIGS. 6a–6e show various arrangements and developments of perforated plugs used for granulate production and of the bores used in those perforated plugs.

DETAILED DESCRIPTION OF THE INVENTION

Figure 4A:
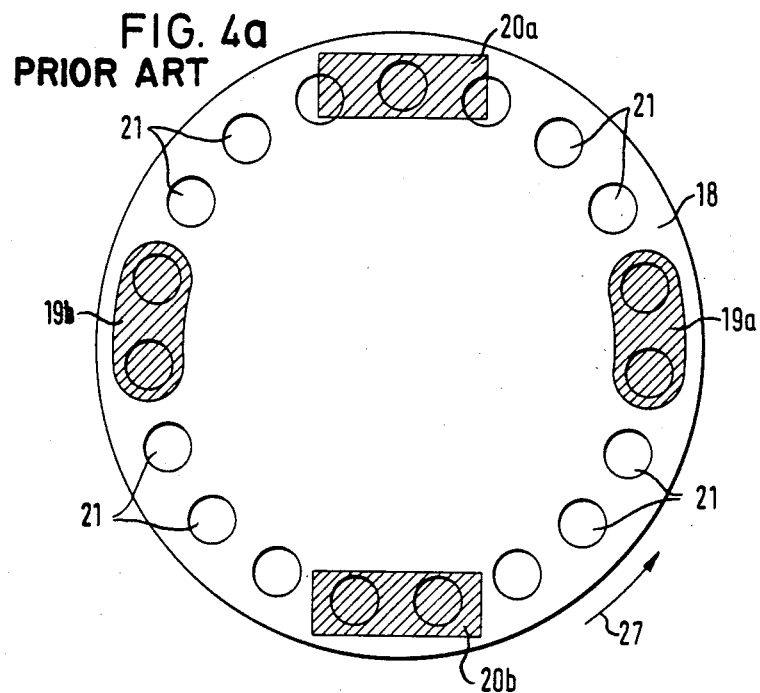
FIG. 4 diagrammatically illustrates a tabletting machine in the form of a rotary press which may also be used in accordance with the invention for granulate production in a manner corresponding to FIG. 2.

FIG. 1 shows in principle, without any other structural details, a tabletting machine in the form of an eccentric press in three different phases of production, first in the production of tablets, i.e. before modification for use in granulate production.

This tabletting machine comprises a top punch 1 and a bottom punch 2. The top punch 1 and the bottom punch 2 co-operate with a die 3. The die 3 comprises a bore 4 into which the powder to be converted into tablets is introduced. This powder generally consists of a mixture of several powder-form materials. To introduce the powder 5 into the bore 4 with the top punch 1 in its raised position, a powder feed unit 6 is provided. In the illustrated embodiment of the tabletting machine, this feed unit is formed by a so-called loading shoe which is mounted on the machine table 8 for reciprocation in the direction of the double arrow 7, the rim of its lower opening touching the machine table 8 so that hardly any powder 5 is able to escape laterally from the loading shoe during its reciprocation.

To compact the powder 5 accommodated in the bore 4, the top punch 1 is lowered into the bore 4, the bottom punch 2 also being partly introduced into the bore 4, as shown in the upper and middle illustrations of FIG. 1. In this way, a tablet 9 is produced in the bore 4 of the die 3 through compaction of the powder 5 and, during or after the removal of the top punch 1, is ejected from the bore 4 by upward displacement of the bottom punch 2 therein, as shown in the lower illustration in FIG. 1.

To enable the tabletting machine shown in FIG. 1 to be used for the production of cylindrical granulates, the bottom punch 2, including its retainer, is removed from the die 3 and replaced by a perforated plug 10. Because the perforated plug 10 of the die 3 has to withstand relatively high pressure and has to be connected accordingly to the die 3, the combination of the die 3 and the perforated plug 10 as a whole is of course a replacement unit which is used in the tabletting machine instead of the die 3 and which is also referred to hereinafter as the granulation die 11 or peforated-plug die. The top punch 1 remains unchanged during the modification. The desired granulate diameter is determined by the diameter of the bores 12 (cf. FIG. 6c) or 12a to 12d (cf. FIG. 6e) in the plug 10 of the granulation die 11.

In addition, a granulate stripping and transporting system is provided beneath the lower end face of the perforated plug (cf. FIG. 3), conducting the crude granulate into a granulate collecting bin or guiding it onto an endless conveyor belt leading to a granulate collecting bin.

The mode of operation of the tabletting machine thus modified for the production of granulate will now be described in detail with reference to FIGS. 2 and 3:

First, as shown in the upper part of FIG. 2, the bore 13 of the granulation die 11 above the perforated plug 10 is filled by means of a powder feed unit 6 in the form of a loading shoe, in the same way as in tablet production. Unless it is being used for the first time, the perforated plug 10 is blocked by compound from the preceding compression cycle. The loading shoe is then removed from the vicinity of the granulation die 11, the top punch 1 is introduced into the bore 13 of the granulation die 11 so that, initially, it compresses powder 16 from which granulate is to be produced into a pressing 14. This production phase is shown in the middle part of FIG. 2.

As the top punch 1 continues to approach the perforated plug 10, the pressing 14 is forced through the perforations 12 in the perforated plug 10 and transformed into cylindrical strands which issue from the underneath of the granulation die 11.

A stripper 17 which co-operates with the lower end face of the perforated plug 10 of the granulation die 11 and which is controlled by the movement of the loading shoe 6 via the linkage 17a separates the strands consisting of the compacted powder 16 from the granulation die and the granulate 15 accumulating is removed, for example, via the chute 17b shown in FIG. 3 which may be provided as the collecting and transporting system. The third phase of the granulate production process described in the foregoing is shown in the lower part of FIG. 2. If necessary, the granulate 15 may then be size-reduced in a size-reduction unit, for example a toothed disc mill, and sifted in a sieve.

In a test conducted in accordance with the invention, an eccentric tabletting press of the "Exacta XI" type (manufactured by Fette), which was modified and used in the manner described with reference to FIG. 2, produced an hourly output of 30 to 50 kg/hour for optimal press utilization.

Figure 4B:
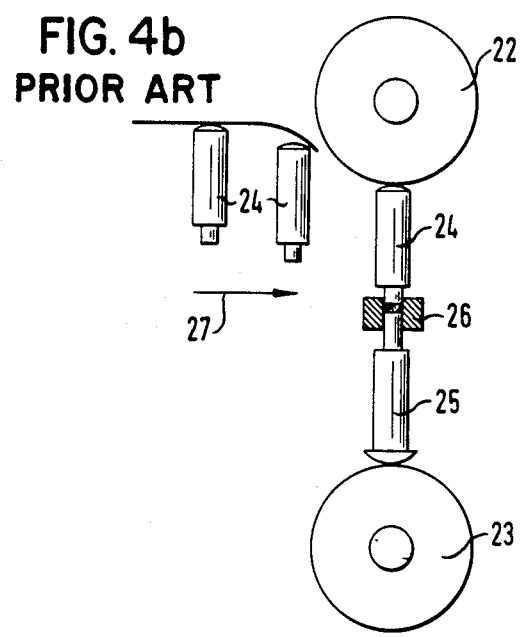

Other tabletting machines than the above-mentioned eccentric press, such as for example a rotary tabletting press of the type shown in principle in FIG. 4, may also be modified and used for granulate production.

The illustrated example of a rotary tabletting press is a rotary press comprising two feed stations and two pressing stations. As can be seen from the upper part of FIG. 4, the two feed stations 19a and 19b and also the two pressing stations 20a and 20b, which have been cross-hatched in the drawing, are provided diametrically opposite one another around the circumference of the circular rotary plate 18. The bores 21 distributed around the circumference of the rotary plate 18, each of which corresponds in principle to a bore 4 in FIG. 1, are indicated by circles.

In contrast to the eccentric press, the transmission of power to the top punch 24 and bottom punch 25 takes place by means of mounted pressure rollers 22 and 23 in the rotary tabletting press. The tablets are ejected by means of a knock-out jaw which is not shown in FIG. 4. The top punch 24 and bottom punch 25 correspond to the punches 1 and 2 in FIG. 1. Provided between the top punches 24 and the bottom punch 25 are dies 26 of which only one is shown in the lower part of FIG. 4 and each of which corresponds to a die 3 in FIG. 1. The direction of rotation of the rotary plate 18 is indicated by an arrow 27. The dies 26 and the top and bottom punches 24 and 25 revolve with the rotary plate whereas the feed station for loading the dies 26 with powder is fixedly installed, as already explained in reference to the upper part of FIG. 3.

Figure 5A:
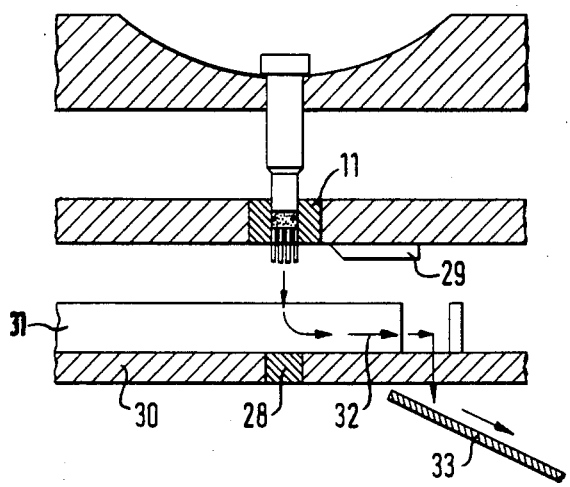
FIGS. 5a and 5b are, respectively a side elevation, partly in section, and a plan view of the granulate stripping and collecting system on a rotary press in another embodiment of the invention.
Figure 5B:
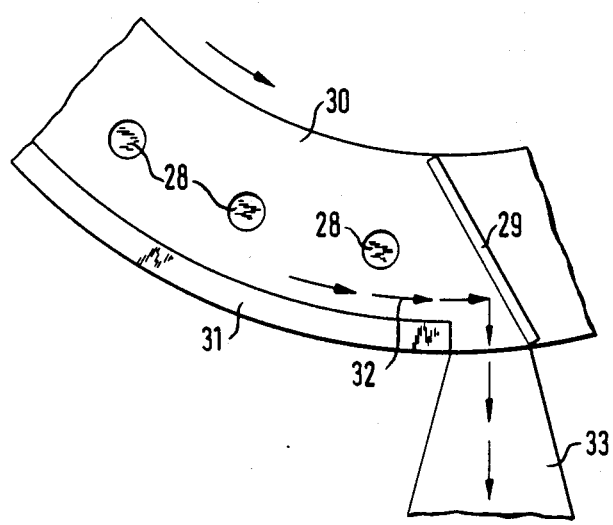

In one embodiment of the invention, a rotary press of the type shown in FIG. 4 may be modified and used as illustrated in FIGS. 5a and 5b. The dies 26 merely have to be replaced by granulation dies 11, the bottom punch 25 removed and a stripper 29, in this case stationary, provided. For collecting and transporting granulate, the plane of the guide plate 30 for the shafts of the bottom punch is provided with a seal 28. In order, in the case of a high-speed machine, to prevent the granulate from being thrown out, fixed border segments 31 may be fitted. The stripper 29 transports the granulate in the direction of the arrow 32 to the chute 33. In this way, it is possible efficiently to transport large quantities of granulates.

It is pointed out in this connection that tabletting machines of the type which may be modified in accordance with the invention for granulate production are described and illustrated in detail, for example, in DE-AS No. 12 91 629 and in DE-PS No. 3 049 597; through this reference, these two publications are made part of the disclosure of the present Application.

Various embodiments of granulation dies 11 with perforated plugs 10 and of bores 12 and 12a to 12d of the perforated plugs 10 are shown in FIGS. 6a to 6e. In the preferred embodiment illustrated in FIG. 6a, the perforated base 10 is flush with the lower edge of the granulation die 11. Accordingly, this embodiment enables the pressed strands to be readily stripped off by means of a stripper 17. This embodiment is particularly suitable in cases where tacky masses adhering to the perforated base 10 are formed during granulate production. If these masses consisting of the powder 16 do not stick or have any tendency to adhere to the perforated plug 10, it would also be possible to use the embodiment of a granulation die 11 shown in FIG. 6b, in which the outlet end of the perforated plug 10 is countersunk in the bore 12.

FIG. 6c is a plan view of a granulation die 11 which shows an exemplary distribution of the bores 12 of the perforated plug 10 in that plug.

The degree of melting of a corresponding binder, which is provided in the powder to be processed into granulate, may be controlled or regulated by means of a heating system 28 and 34, for example in the form of an electrical strip heater, built into 28 or fitted to 34 the die 11 in conjunction with a device for controlling or regulating the temperature of the heating system 28 or 34. The working temperature should amount to at least 25° C. and at most a temperature corresponding to the melting range of the binder used. The temperature of the granulation die 11 during granulate production is kept by means of a thermostat, which may be used as the device for controlling or regulating the temperature, at a predetermined granulation temperature which is kept constant to within, preferably, ±5° C. In this way, cylindrical granulate may be produced with very weak compressive forces, for example of the order of 20 $kN/cm^2$.

Thus, compared with conventional tablet production, the demands on a tabletting press used in accordance with the invention for granulate production represent only a fraction of the power consumption required for conventional tablet production.

Preferred diameters of the bores 12 in the perforated plug 10 of the granulation die 11 are between 0.8 and 2.5 mm.

Preferred embodiments of bores in a perforated plug 10 are shown in FIG. 6e. The bores 12a are completely cylindrical bores of uniform diameter. By contrast, the bores 12 b widen conically at their inlet ends although, for the most part, they are again cylindrical with a uniform diameter. The bores 12c have a cylindrical middle section of uniform diameter, widen conically at their inlet ends and have a cylindrical outlet section of uniform diameter, although this diameter is larger than the diameter of the middle section, the cylindrical middle section and the cylindrical outlet section being joined by a conical transition. Finally, the bores 12d have a conical inlet section which merges into a cylindrical middle section of relatively large, uniform diameter which in turn merges via a conical transition into a cylindrical outlet section of uniform, but considerably smaller diameter.

Preferred lengths of the bores 12 and of the bores 12a to 12d are in the range from 2.0 to 5.0 mm.

For monitoring the forces occurring during granulate production, strain gauges may be arranged for example on the top punch 1 of an eccentric press. The output signal of these strain gauges may be passed to an amplifier and, after amplification, may be visualized by means of a flying-spot recorder.

The powders to be processed into granulates, which are in fact powder mixtures, should contain at least 20% of a powder-form binder which has a melting point of from 35° to 90° C. and a particle size of smaller than 30 μm. In addition, the powder should contain up to 80% of a powdered active principle having a particle size of from 20 to 100 μm and from 0 to 70% of a powder-form auxiliary having a particle size of smaller than 300 μm. If required, from 10 to 30% of the powder-form binder may be replaced by a liquid binder. Examples of liquid binders are PEG, silicone oil, paraffin oil, vegetable oil, water, etc. The powder mixtures are produced in a suitable intensive mixer, for example of the Diosna or Loedige type with a mixing tool and a size-reducing tool.

We claim:

1. A method of changing and using a tabletting machine for pharmaceutical products, said tabletting machine comprising:
   a die formed with a bore to receive a pharmaceutical powder, said die being mounted on a machine table;
   at least one first means for actuating an upper punch which cooperates with said die, said upper punch being displaceable into the bore from above to compress the pharmaceutical powder accommodated in the bore;
   at least one second means for actuating a lower punch which cooperates with said die, said lower punch being displaceable into the bore from below to act oppositely to said upper punch on said pharmaceutical powder in said bore; and
   a powder feed unit which introduces the pharmaceutical powder into said bore when the upper punch is in its raised position outside said bore;
   said method of changing of said tabletting machine comprises the steps of:
   removing said lower punch from said tabletting machine;
   replacing said die by another die having a bore with a perforated plug in said bore;
   providing a granulate stripping means beneath the machine table at the vicinity of the lower end face of said perforated plug; and
   providing a granulate collecting and transporting means below said bore; and
   said using comprises producing pharmaceutical granulates by said changed tabletting machine.

2. A method of changing and using a tabletting machine for pharmaceutical products, which comprises:
   a die formed with a bore to receive a pharmaceutical powder, said die being mounted on a machine table;
   at least one first means for actuating an upper punch which cooperates with said die, said upper punch being displaceable into the bore from above to compress the pharmaceutical powder accommodated in the bore;
   at least one second means for actuating a lower punch which cooperates with said die, said lower punch being displaceable into the bore from below to act oppositely to said upper punch on said pharmaceutical powder in said bore; and
   a powder feed unit which introduces the pharmaceutical powder into said bore when the upper punch is in its raised position outside said bore;
   said method comprising the steps of:
   removing said lower punch from said tabletting machine;
   replacing said die by another die having a bore with a perforated plug in said bore;
   providing a granuate stripping means beneath the machine table at the vicinity of the lower end face of said perforated plug;
   providing a granulate collecting and transporting means below said bore; and producing pharmaceutical granulates by said changed tabletting machine.

3. The method according to claim 2 wherein said machine is re-changed into a tabletting machine, said re-changing comprises the steps of:
    reinserting said die having a bore without a perforated plug;
    reinserting said lower punch;
    removing said granulate stripping means; and
    removing said granulate collecting and transporting means.

4. The method according to claim 3, said tabletting machine comprises a guide plate having a guide hole for guiding the lower punch, wherein said changing and using comprises sealing of said guide hole by a seal and using said guide plate as said granulate collecting and transporting means.

5. The method according to claim 2 further including the step of:
    adjusting at least one of diameter of the die bore, length of the die bore, extrusion temperature, and depth of penetration of the punch into the bore to control the density of the granulated material.

* * * * *